United States Patent [19]

Page

[11] 4,418,762
[45] Dec. 6, 1983

[54] BALANCED IMPLEMENT TRANSPORT VEHICLE

[75] Inventor: James H. Page, Bottineau, N. Dak.

[73] Assignee: Western Manufacturing Company, Inc., Bottineau, N. Dak.

[21] Appl. No.: 285,141

[22] Filed: Jul. 20, 1981

[51] Int. Cl.³ ............................................. A01B 73/00
[52] U.S. Cl. .................................. 172/311; 172/456; 172/662
[58] Field of Search ............... 172/311, 452, 456, 460, 172/458, 457, 446, 473, 501, 662, 776, 463, 468, 469, 470, 471

[56] References Cited

U.S. PATENT DOCUMENTS

| | | | |
|---|---|---|---|
| 1,162,457 | 11/1915 | Crane | 172/471 X |
| 2,005,568 | 6/1935 | Smith | 172/468 |
| 3,154,151 | 10/1964 | Zimmer et al. | 172/456 |
| 3,186,497 | 12/1965 | Forbes | 172/662 X |
| 3,490,542 | 1/1970 | Eiten | 172/470 |
| 3,539,016 | 11/1970 | Bauer et al. | 172/311 |
| 3,640,345 | 2/1972 | Sosalla | 172/311 |
| 3,658,136 | 4/1972 | Ernst | 172/468 X |
| 3,700,040 | 10/1972 | Sosalla et al. | 172/311 |
| 3,841,412 | 10/1974 | Sosalla | 172/311 |
| 4,248,310 | 2/1981 | McWilliams | 172/662 X |

FOREIGN PATENT DOCUMENTS

| | | | |
|---|---|---|---|
| 964100 | 3/1975 | Canada | 172/662 |
| 155650 | 8/1956 | Sweden | 172/471 |
| 2057833 | 4/1981 | United Kingdom | 172/311 |

Primary Examiner—Richard T. Stouffer
Assistant Examiner—William H. Honaker
Attorney, Agent, or Firm—Peterson, Palmatier, Sturm, Sjoquist & Baker, Ltd.

[57] ABSTRACT

A balanced implement transport includes a rotatable drawbar having a first plurality of spaced apart implement hitch frames, for connection to individual implements to be drawn over the surface of the ground disposed for rotation with the drawbar between a position generally parallel with the surface of the ground, and a raised, substantially vertical transport position; and a second plurality of spaced apart implement hitch frames, for connection to individual implements to be drawn over the surface of the ground, rotatably disposed on said drawbar, for adjustable positioning thereon between a position parallel to the first plurality of implement hitch frames and a position of greater than 90 angular degree displacement so that the centers of gravity of the first implement hitches may be disposed on one side of the drawbar and those of the second implement hitches are disposed on the other side of the drawbar. The implement hitches are suitably staggered and disposed to be operative with ground working implements attached at all times.

8 Claims, 12 Drawing Figures

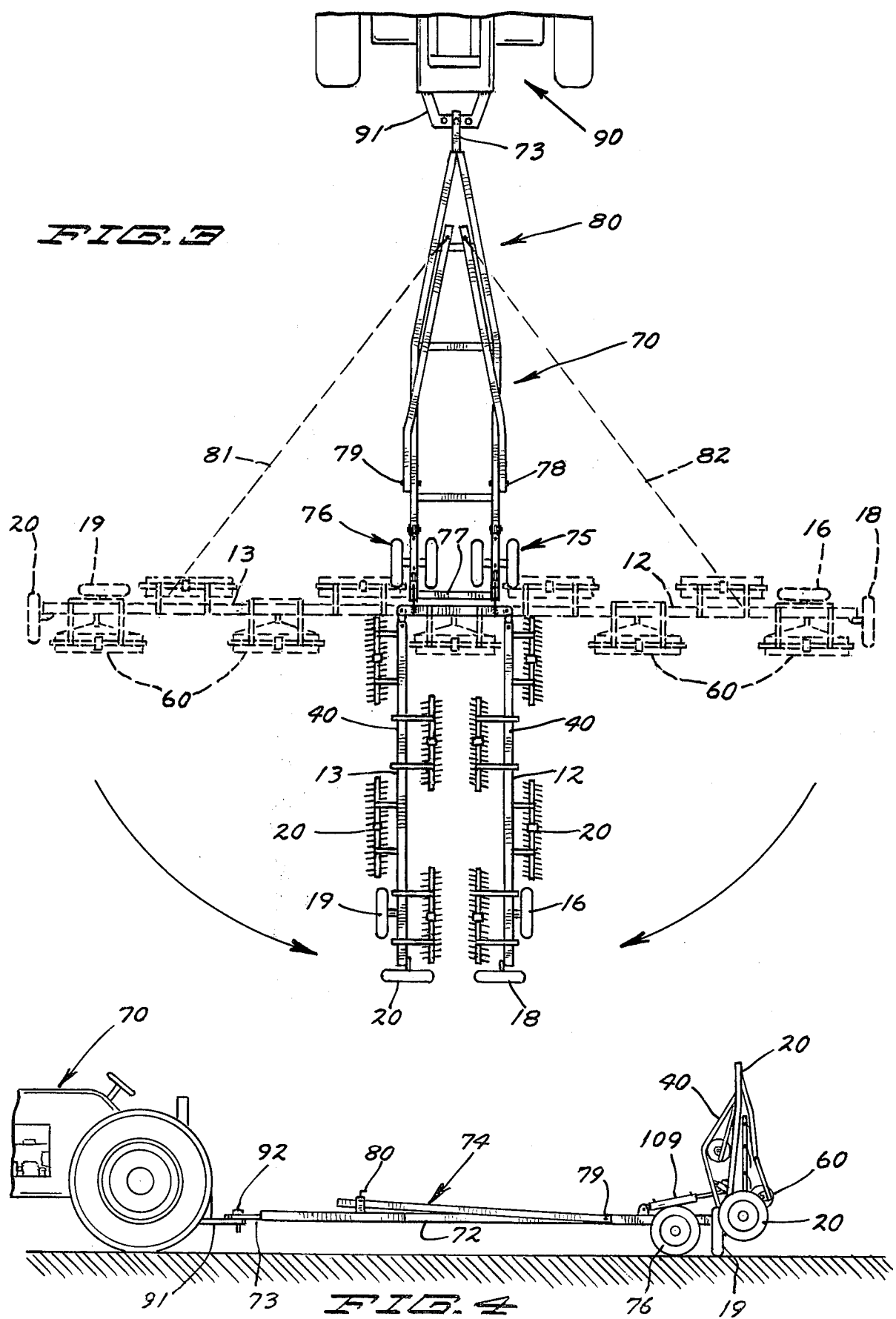

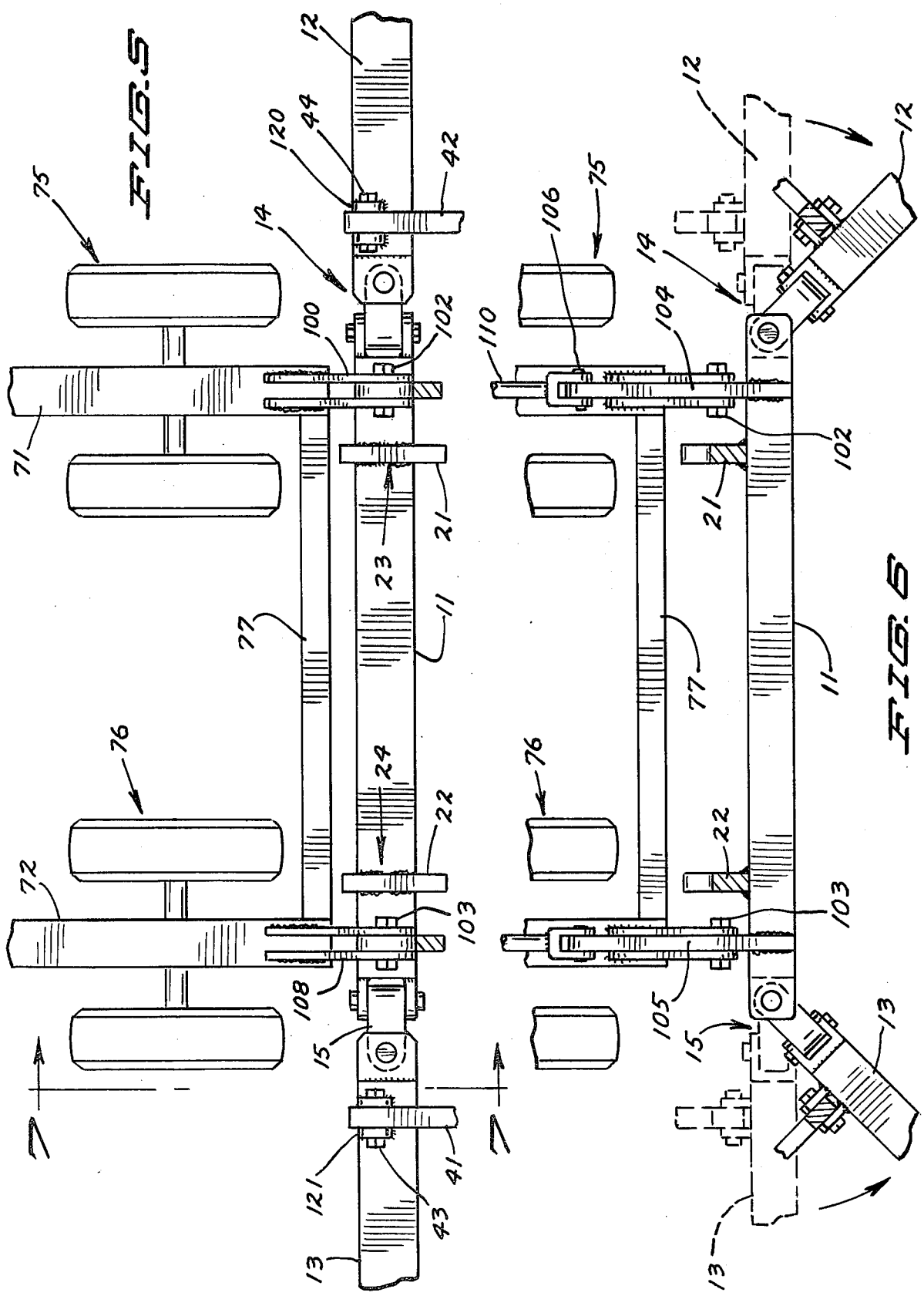

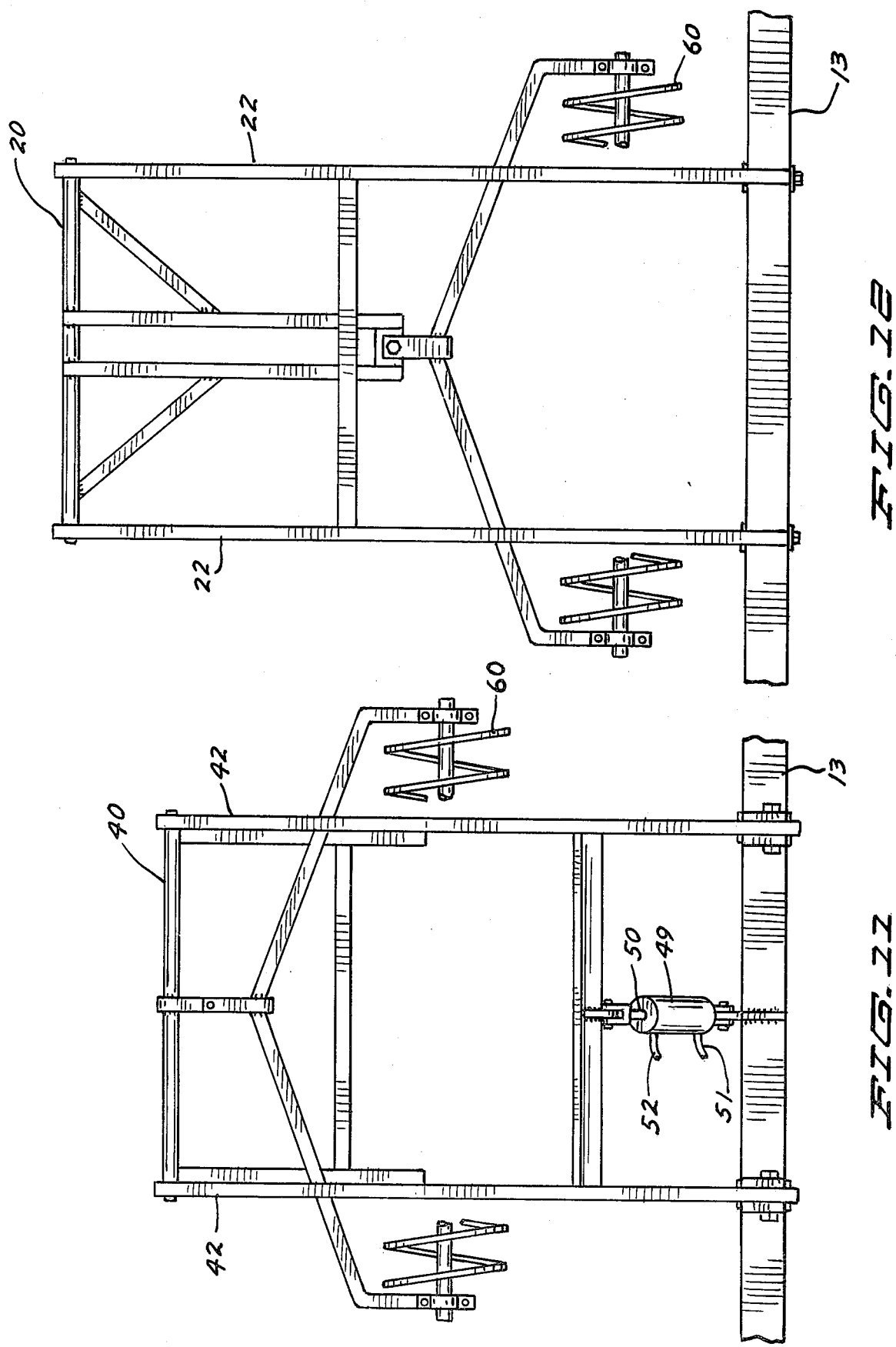

ically parallel to the surface of the earth and in a vertical upraised position. The other plurality of alternate frames are adjustably rotatably disposed on the drawbar and for rotation therewith, such that their position with respect to the drawbar may be adjusted from one substantially parallel to the surface of the earth or to a position, with respect to the drawbar, that will dispose the center of gravity thereof on the opposite side of the drawbar with respect to the first plurality of alternately disposed frames. It will be seen that the last mentioned plurality of frames may be suitably rotated to various intermediate positions, with respect to the drawbar as it rotates, so as to place the center of gravity of the frames (and attached implements) on the opposite side of the drawbar as it is rotated to raise the other frames to a vertical (transport) position.

BALANCED IMPLEMENT TRANSPORT VEHICLE

BACKGROUND OF THE INVENTION

1. Field of the Invention

This invention relates to improvements in agricultural implement transport vehicles and is more particularly directed to a balanced implement transport vehicle to be used as a drawbar for a multiplicity of earth-working implements, when in an operative position, and to carry the same from one location to another when in a transport position.

2. Description of the Prior Art

The prior art is replete with numerous examples of towing vehicles to distribute the draft force from a prime mover to a plurality of earth-working implements. Many of such vehicles are of such size, when in operative position, as to be particularly suited to a foldable type of construction, and, in many cases, are configured to provide a lifting of the implements attached thereto during transport activities from one location to another. At least two disadvantages of known prior art vehicles have been noted to exist in the ponderosity dictated by the mass of the structural aspects of such apparatus that is required to raise and support the implements during the lifting and transport operations and the lack of versatility to operate under adverse operating conditions or with a variety of earth-working implements.

Examples of such prior art, as has been determined in the course of a search of the U.S. Letters Patent, are set forth in the following list:

| Patent Number | Inventor | Issue Date |
| --- | --- | --- |
| 3,428,333 | Nelson | 2/18/69 |
| 3,967,684 | Haverdink | 7/6/76 |
| 3,154,151 | Zimmer et al | 10/27/64 |
| 4,088,346 | Schreiner et al | 5/9/78 |
| 3,841,412 | Sosalla | 10/15/74 |
| 3,162,459 | Marmorine et al | 12/22/64 |
| 3,935,696 | Pavel | 2/3/76 |
| 3,006,422 | Mighell | 10/31/61 |
| 4,002,334 | Wilbeck | 1/11/77 |
| 3,651,870 | Calkins | 3/28/72 |
| 3,901,327 | Mitchell | 8/26/75 |

The objects and advantages of this invention will become apparent from the following Summary and Description.

SUMMARY OF THE INVENTION

It is an object of this invention to provide a vehicle to receive, tow and carry a plurality of earth-working implements in an improved and facile manner.

It is a further object of this invention to provide a balanced implement transporting vehicle in which the vehicle may be fabricated of lightweight material and which is stable, for the purposes designed, in a draft or towing mode of operation as well as a transport operation.

In the illustrated embodiments of this invention, a three-section foldable drawbar is rotatably disposed on a wheeled support that is in turn adapted to be attached to a source of draft force, such as a prime mover tractor. A plurality of implement connecting frames are disposed along the length of the rotatable and foldable drawbar such that one plurality of alternate frames are ridigly attached to the rotatable drawbar for rotation therewith and to be operated between positions substan-

BRIEF DESCRIPTION OF THE DRAWINGS

FIG. 3 is a top plan view of the apparatus of FIG. 1 showing the invention in each of two operating positions;

FIG. 4 is a side elevational view of the apparatus shown in FIGS. 1, 2 and 3;

FIG. 5 is an enlarged fragmentary plan view, taken along section line 5—5 on FIG. 2 of the drawings showing the elements of the apparatus in a first position;

FIG. 6 is a view similar to FIG. 5 showing the elements in a second position;

FIG. 11 is a fragmentary enlarged rear elevational view of a portion of FIG. 2; and FIG. 12 is a fragmentary enlarged rear elevational view of a portion of FIG. 2.

DESCRIPTION OF THE PREFERRED EMBODIMENT

Figure 1:
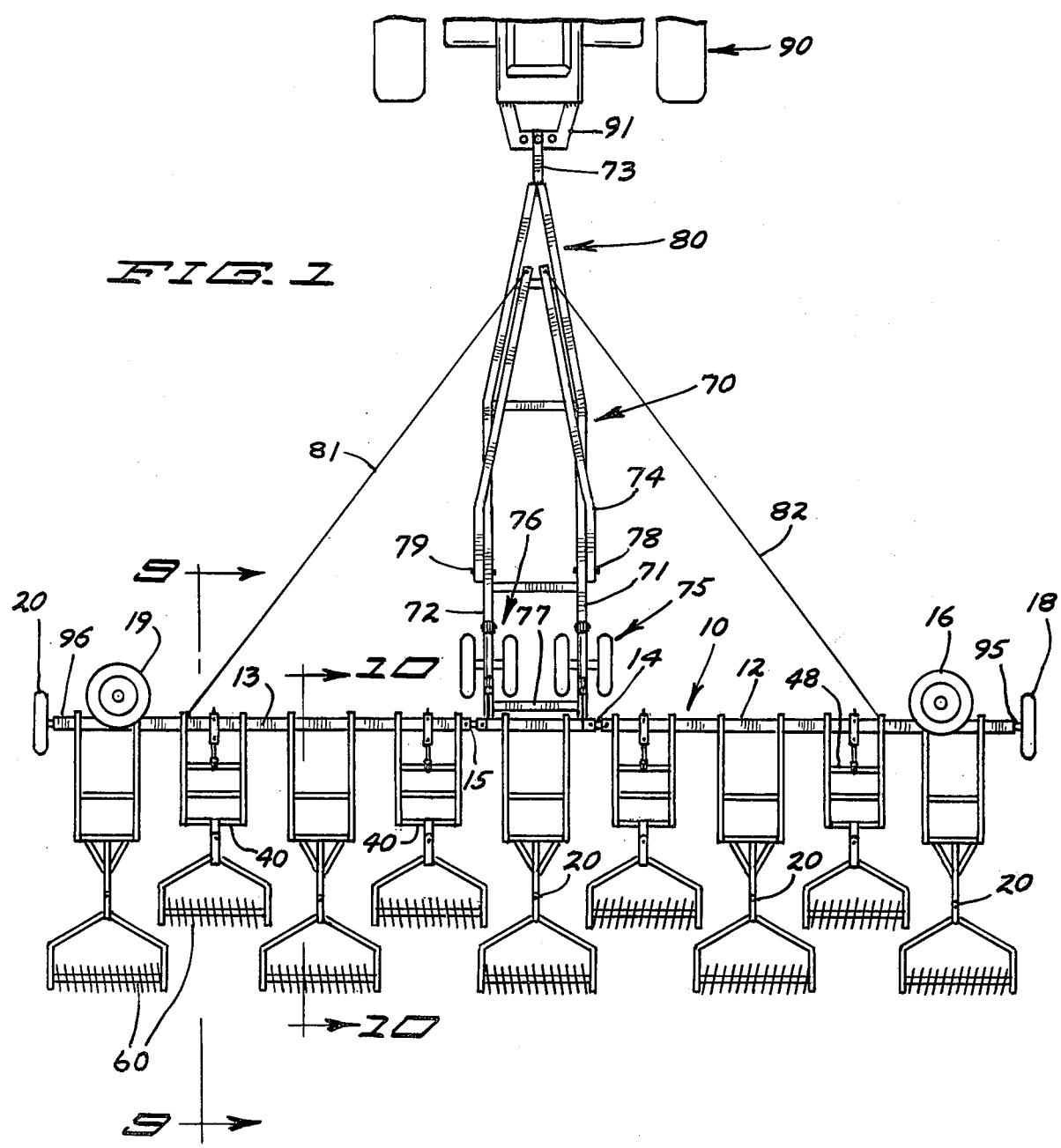
FIG. 1 is a top plan view of the vehicle in working position behind a tractor-prime mover.

The vehicle of this invention is indicated generally by reference character 30 and includes a drawbar 10 that is rotatably disposed, for approximately 90° rotation, on the rear end of a towing frame 70 that is in turn attached to the drawbar of a tractor 90. A plurality of long hitch frames, 20, and short hitch frames, 40, are shown alternately disposed along the length of drawbar 10.

Drawbar 10 is shown comprised of a center section 11, and right and left sections 12 and 13 that are connected to center section 11 through right U-joint 14 and left U-joint 15. Right and left drawbar sections 12 and 13 on drawbar 10 are further provided with right and left transport wheels 16 and 17, disposed on suitable axles 93 and 94 and right and left support wheels 18 and 19 disposed on suitable axles 95 and 96. Center section 11 of the drawbar 10 is rotatably disposed on the rear portion of towing frame 70 for rotation about a lateral axis so that right and left sections 12 and 13 are rotatable therewith, as will be described below.

Towing frame 70 includes a right side rail 71, and left side rail 72 and a hitch 73, adapted for connection to the drawbar 91 of tractor 90 through a suitable pin 92. Towing frame 70 is supported by right and left wheels 75 and 76 and includes a wing frame 74 that is pivotally disposed on the top of side rails 72 and 73 through suitable pivots 78 and 79 and includes a front latch, indicated generally by reference character 80. Left cable 81 is shown extending from the forward portion of rotatable wing frame 74 to the outer portion of left section 13 on drawbar 10 and right cable 82 is shown connected from the forward portion of wing frame 74 to the outer portion of right portion, 12, of drawbar 10.

Referring to FIGS. 5, 6, 7, and 8 of the drawings, center section 11 of drawbar 10 is shown pivotally disposed on right and left pivots 100 and 101 that are attached to the top rear of side rails 71 and 72 on towing frame 70, through pins 102 and 103 that are connected through right and left lever arms 104 and 105 attached, through suitable means, such as by welding, to center section 11. The opposite ends of right lever arm 104 and left lever arm 105 are provided with appropriate pivot connections 106 and 107 respectively to hydraulic pistons 110 and 111 respectively. A pair of right and left hydraulic cylinders, 108 and 109 are shown pivotally disposed on right and left pivot assemblies 112 and 113 disposed on right and left side rails 71 and 72 on towing frame 70. Left cylinder 109 is shown having suitable hoses 115 and 116 for connection to a source of hydraulic fluid under pressure (not shown).

Right and left side rails 21 and 22 of long hitch frame 20 are shown attached in spaced apart disposition through suitable mounting means 23 and 24 (which may be welded or bolted or the like) for rotation with center section 11 on drawbar 10. Similarly the left side 42 of a short hitch frame 40 is shown pivotally disposed in a pivot 120, through pin 44 and the right side rail of a short frame 40 is shown pivotally disposed in a pivot means, 121, through pin 43.

Referring to FIGS. 9, 10, 11 and 12 of the drawings, the relationship and relative positions of the short and long hitch frame members 20 and 40 with respect to the surface of the earth, drawbar 10 and the other portions of the vehicle, as well as the configuration of the long and short hitch frames, are shown in various positions of the cycle of operation.

Long hitch frames 20 and short hitch frames 40 are configured and disposed on drawbar 10 in a staggered relationship to provide for earth-working implements of a size that will permit an overlapping earth-working function whereby the entire width of drawbar 10 may be utilized to completely work the surface of the ground over which it may be drawn.

Long hitch frame 20 is provided with right and left side members 21 and 22 that are suitably interconnected. The front ends are mounted upon drawbar 10, for rotation therewith, through right and left mounting means 23 and 24. The rear ends of side members 21 and 22 are pivotally connected to an elongated implement connector 25 at right and left pivot means 26 and 27. An implement 31 is shown operatively connected, through appropriate means (not shown) to the rear end of implement connector 25.

Short hitch frame 40 is also generally rectangularly shaped and includes right and left side members 41 and 42 that are rotatably disposed on front right and left pivot means 43 and 44 to provide a rotatable draft connection to drawbar 10. Side members 41 and 42 are shown having a curved side configuration to allow for the positioning of an implement in a suspended location thereunder so that the center of gravity is located at a position on the front side of drawbar 10. A comparatively short implement connector 45 is shown pivotally connected to the rear ends of right and left side members 41 and 42 through right and left pivot means 46 and 47. An arm 48, adapted to pivotally receive the end of a hydraulic cylinder 49 at one end is rigidly connected to rotate with drawbar 10. A piston 50 extends from cylinder 49 to a member disposed intermediate right and left sides 41 and 42 on short hitch frame 40. Cylinder 49 is provided with hoses 51 and 52 for connection to a suitable source of hydraulic fluid under pressure.

It may now be appreciated that long hitch frames 20 are operable to rotate with the entire length of drawbar 10 and that short hitch frames 40 are likewise operable to rotate with drawbar 10 in a similar fashion and are also adjustably rotatable with respect to drawbar 10 as will be set forth below. Hydraulic cylinders 108 and 109 are typically operated in unison through suitable means (not shown) to rotate drawbar 10 between its transport and earth working positions. Hydraulic cylinders 49 in each of short hitch frames, 40, are operated independently of hydraulic cylinders 108 and 109, but typically are operated in unison through suitable means (not shown).

Other implements 61, may also be suitably attached to drawbar 10 for concurrent operation.

OPERATION OF THE ILLUSTRATED EMBODIMENT

Figure 2:
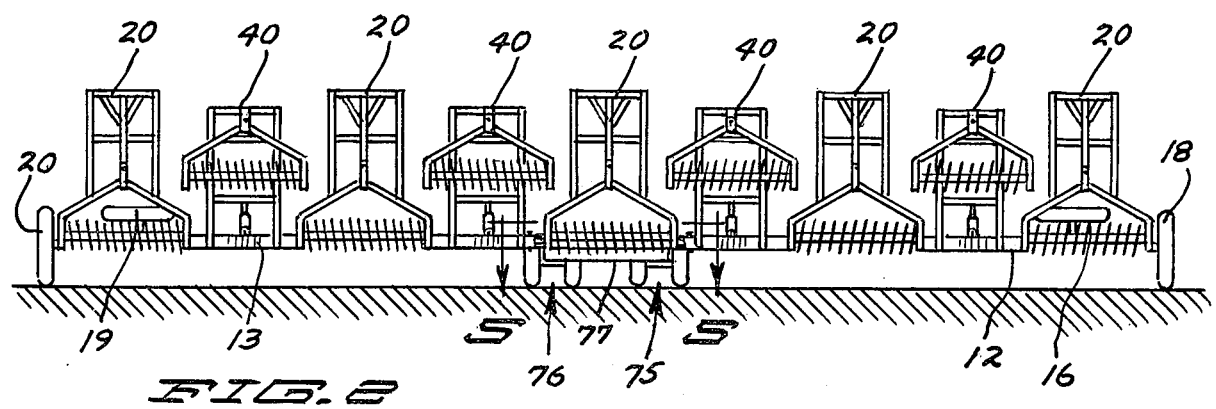
FIG. 2 is a rear elevational view of the apparatus shown in FIG. 1.
Figure 7:
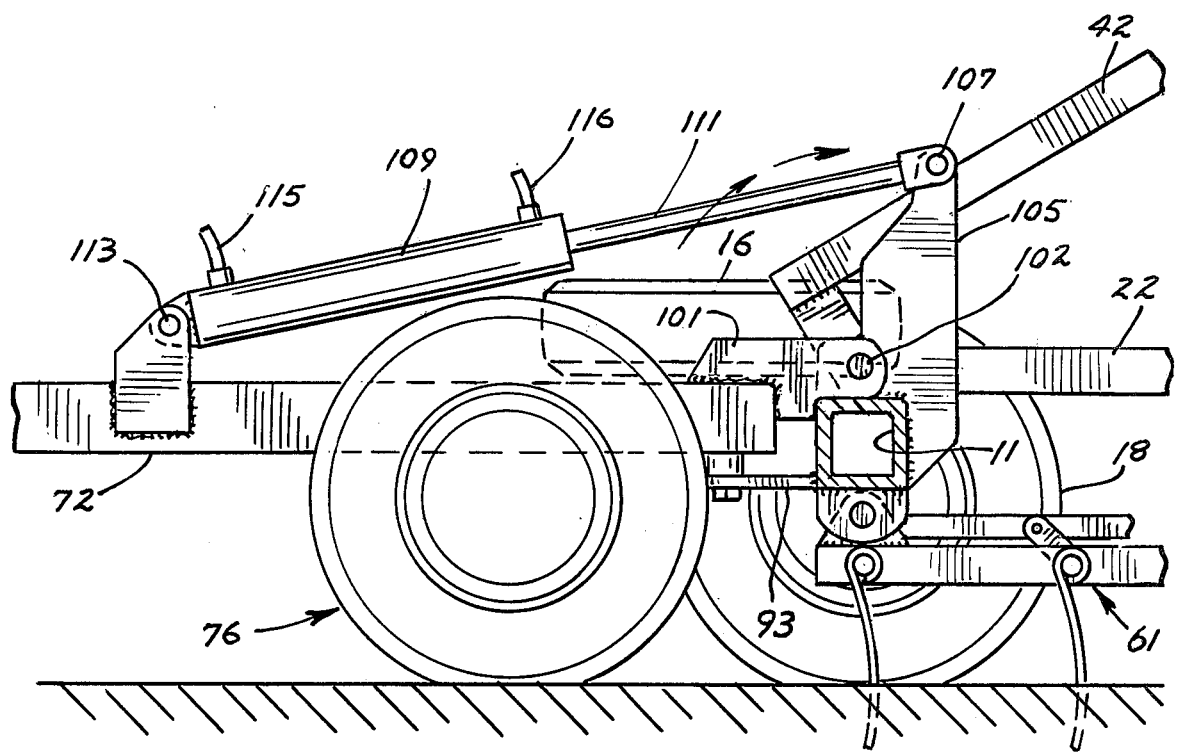
FIG. 7 is an enlarged fragmentary side elevational view taken along section line 7—7 on FIG. 5 of the drawings showing the elements in a first position.
Figure 8:
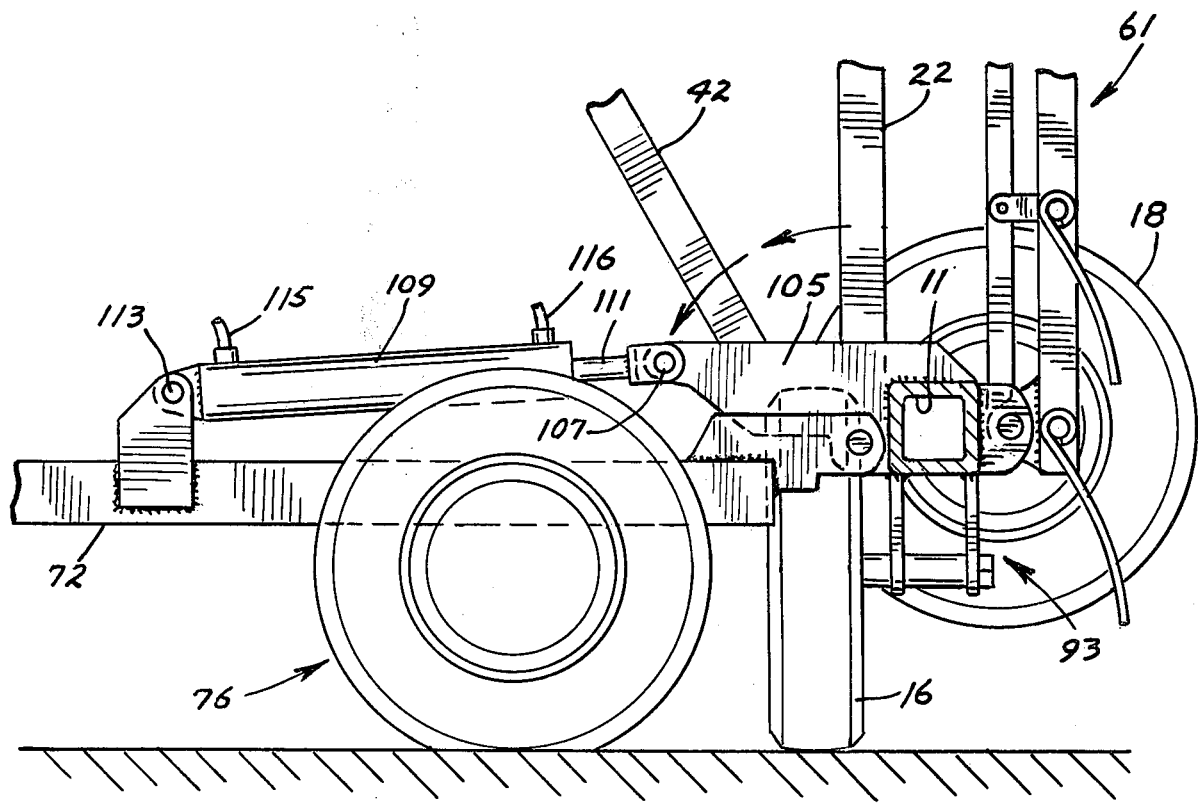
FIG. 8 is a view similar to that of FIG. 5 showing the elements in a second position.

FIG. 1 and the dotted outline portions of FIG. 3 illustrate a plan view of the invention in operative earth-working disposition. The solid outline on the plan view of FIG. 3 indicates the apparatus in a transport position, FIG. 2 is a rear view of the apparatus with the implements in a raised transport position and drawbar 10 in an operative position.

Figure 9:
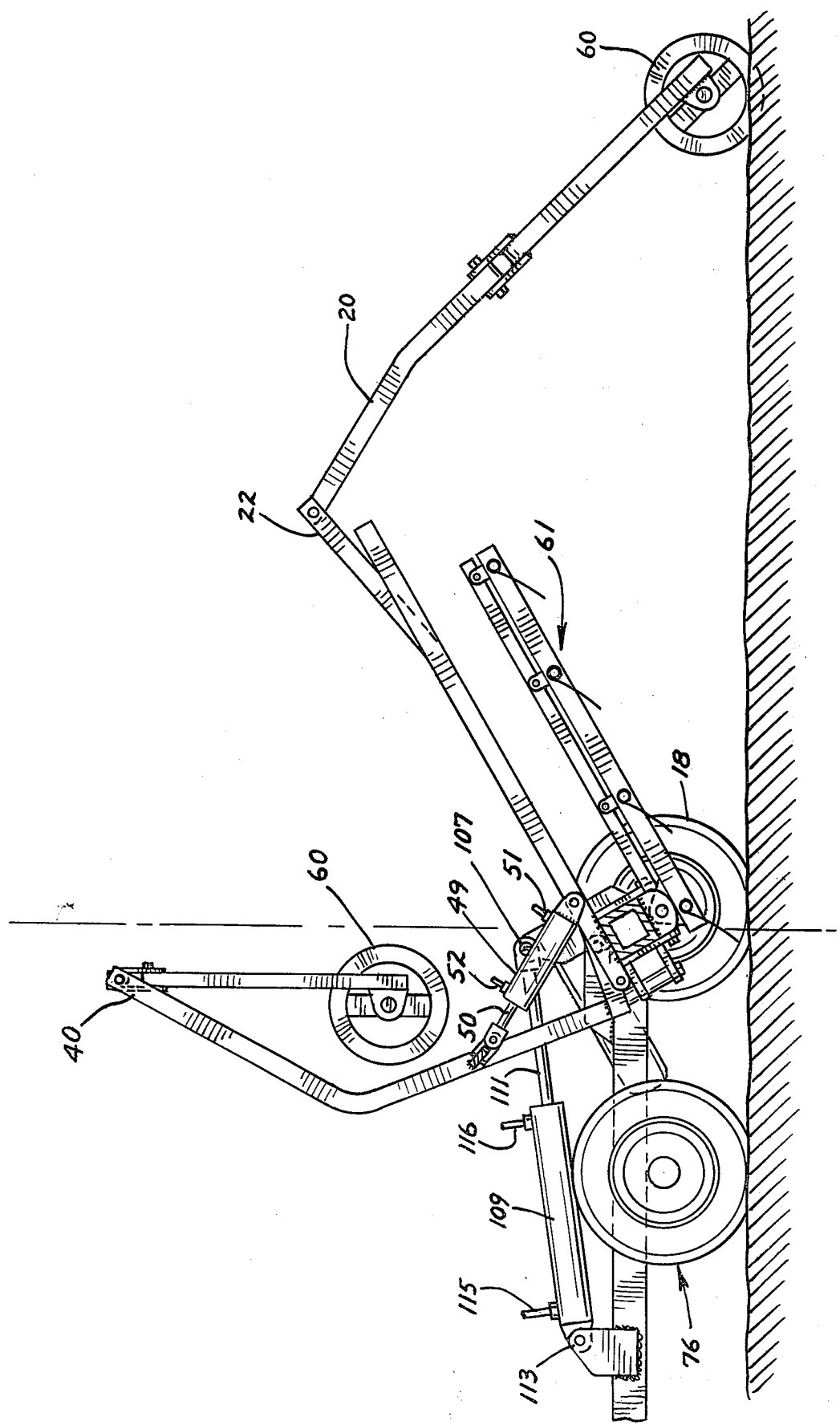
FIG. 9 is an enlarged fragmentary sectional side elevational view taken along section line 9—9 on FIG. 1 of the drawings, showing the elements in a first position.
Figure 10:
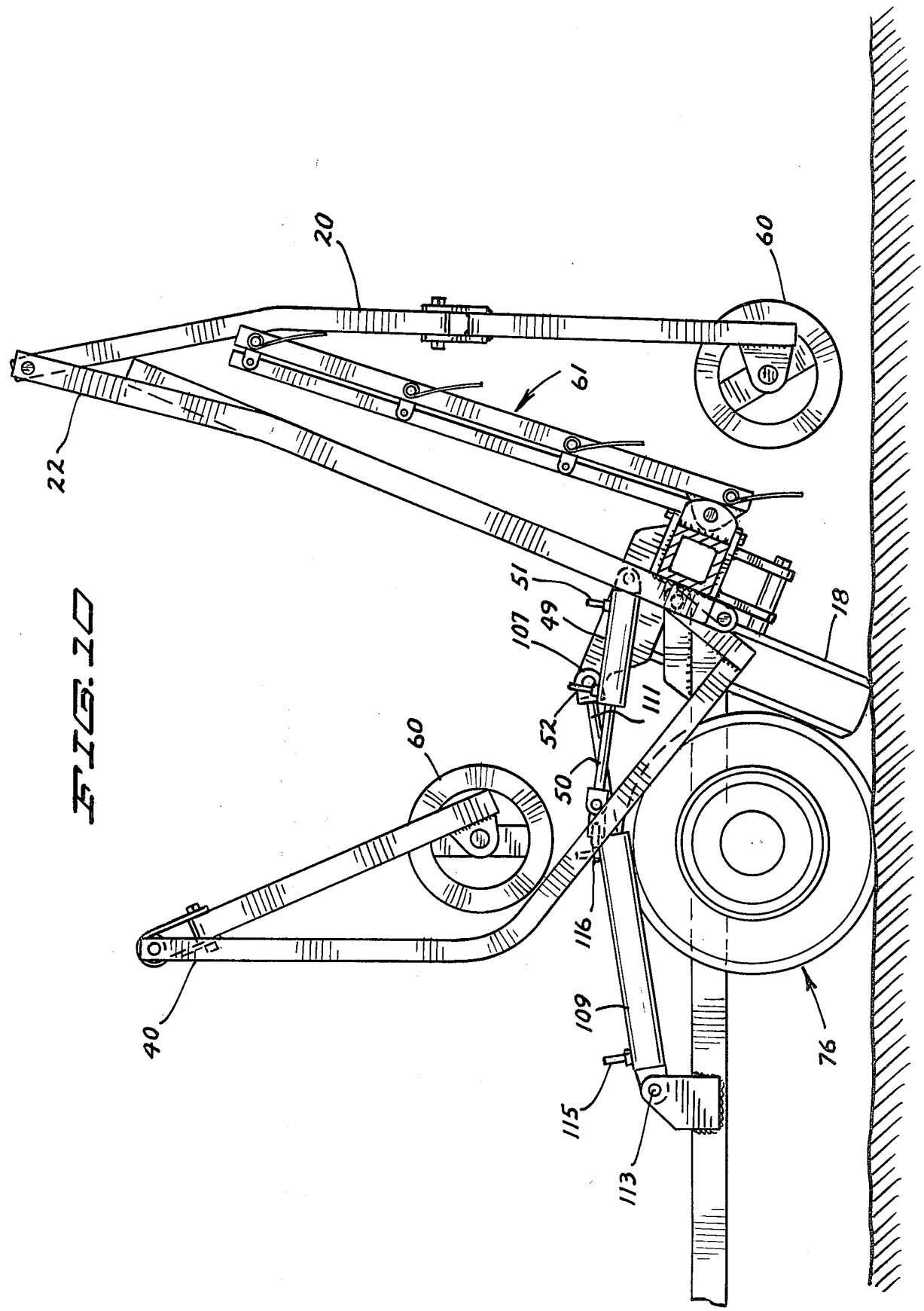
FIG. 10 is similar to FIG. 9 showing the elements in a second position.

With the apparatus in the position of FIG. 1 and assuming that an area of ground has been covered, an operator on tractor 70, being provided with a typical hydraulic control system (not shown) will initiate the rotation of drawbar 10 through suitable energization of right and left cylinders 108 and 109 to cause drawbar 10 to start rotation in a counterclockwise direction (as viewed on FIGS. 9 and 10). He will have previously applied provide fluid under pressure to cylinders 49 on short hitch frames 40 to first initially raise short hitch frames 40 from the generally horizontal earth-working position to a generally vertical over center position as illustrated in FIG. 9. The counterclockwise rotation of drawbar 10 initiates the movement of long hitch frames 20, carried by drawbar 10, from the generally horizontal earth-working position toward a vertical transport position. FIG. 10 shows the relationship of long and short hitch frames 20 and 40 as the implements 31 are raised into a transport position.

When the rotation of drawbar 10 has been completed through an approximate 90 degree sector, transport wheels 16 and 17 will be in a vertical position to support the outer ends of right and left sections 12 and 13 on drawbar 10 and the relationship of short hitch frames 40, having traveled past a vertical position may be adjusted to balance the weight on the forward side of drawbar 10 with the weight on the rear side. With all of the implements in the raised position, as shown on FIGS. 2 and 4, the front latch 80 on towing frame 70 may be released and tractor 90 driven in a forward direction which will result in right and left sections 12 and 13 on drawbar 10 swinging rearwardly as they pivot about universal joints (knuckle) 14 and 15 respectively and wing frame 74 will raise upwardly and assume a near vertical position (not shown).

It may be noted that the relative position of the short and long frame hitches 40 and 20 in the solid outline portion of FIG. 3 allows the use of implements having a maximum earth-working width due to the disposition of the short frames 40 adjacent center portion 11 on drawbar 10 so that in the transport mode of operation, implements supported therefrom are disposed on the outside of the transport mode of the vehicle.

As may be now be appreciated, the invention provides an implement vehicle which achieves a substantial increase in efficiency through the use of lighter weight materials and hydraulic system components with an attendant result that the vehicle becomes more flexible in operation due to the lack of interference between the implements and frames when in the raised transport mode of operation and, because of the balanced load disposed over drawbar 10, the effects of rough terrain and speed of the vehicle are substantially less destructive to the structure.

I claim:

1. An implement drawbar and transport comprising in combination;

an elongated drawbar means;

dirigible support means adopted for connection to a prime mover and including means for rotatably mounting said drawbar for movement between working and transport positions and in lateral transverse relationship with the line of draft on said support means;

a first plurality of implement draft connection means mounted on said drawbar for rotation therewith for operation between a generally horizontal working position and a generally vertical transport position;

a second plurality of implement draft connection means rotatably mounted on said drawbar means for rotation therewith for operation between a generally horizontal working position, a balanced lifting position and a generally vertical transport position;

first means connected to said second plurality of implement draft means and second means connected to said drawbar means for, said first means independently rotating said second plurality of implement draft means with respect to said drawbar means and said second means rotating said drawbar means and disposing said first plurality of implement draft connection means in a balanced position with respect to said second plurality of draft connection means with said first and second pluralities of draft connection means being on either side of said drawbar as said drawbar is rotated between working and transport positions.

2. The apparatus of claim 1 in which the first and second pluralities of implement draft connection means are alternately disposed along the elongated drawbar.

3. The apparatus of claim 2 in which the drawbar means includes foldable side sections.

4. The apparatus of claim 3 in which the outer ends of the drawbar include rotatable support means engageable with the surface of the earth in a first earth working position and in a second transport position.

5. The apparatus of claim 1 in which the drawbar means includes foldable side sections.

6. The apparatus of claim 1 in which the outer ends of the drawbar include rotatable support means engageable with the surface of the earth.

7. The method of lifting and transporting a plurality of earth working implements on a rotatable drawbar which comprises the steps of;

fixedly attaching one half of a plurality of earth working implements to a drawbar rotatable between working and transport positions;

adjustably, rotatively, rigidly attaching the other half of a plurality of earth working implements to said drawbar; positioning said one half and said other half of said plurality of earth working implements on one side of said drawbar in the working position thereof;

rotating said other half of said plurality of earth working implements to a balancing position on the opposide side of said drawbar from said working position;

rotating said drawbar from said working to said transport position; and thereby rotating said one half of said plurality of earth working implements to a raised transport position on the same side of said drawbar as said working position while maintaining said other half of said plurality of earth working implements on the opposite side of said drawbar.

8. The method of claim 7 in which the balancing position of the one half of the implements is adjusted as the remaining implements are raised.

* * * * *